(12) United States Patent
Kawamoto et al.

(10) Patent No.: US 7,294,594 B2
(45) Date of Patent: *Nov. 13, 2007

(54) GLASS COMPOSITION

(75) Inventors: Toru Kawamoto, Otsu (JP); Yoshifumi Sato, Otsu (JP); Toshifumi Matsuda, Otsu (JP)

(73) Assignee: Nippon Electric Glass Co., Ltd., Shiga-Ken (JP)

( * ) Notice: Subject to any disclaimer, the term of this patent is extended or adjusted under 35 U.S.C. 154(b) by 331 days.

This patent is subject to a terminal disclaimer.

(21) Appl. No.: 10/781,326

(22) Filed: Feb. 17, 2004

(65) Prior Publication Data

US 2004/0186000 A1   Sep. 23, 2004

(30) Foreign Application Priority Data

Feb. 18, 2003 (JP) ............................. 2003-039613
Jan. 27, 2004 (JP) ............................. 2004-018335

(51) Int. Cl.
C03C 6/02 (2006.01)
C03C 3/076 (2006.01)
C03C 3/091 (2006.01)
C03C 3/118 (2006.01)

(52) U.S. Cl. ...................... 501/27; 501/55; 501/66; 501/59

(58) Field of Classification Search .............. 501/27, 501/55–79
See application file for complete search history.

(56) References Cited

U.S. PATENT DOCUMENTS 3,622,296 A    11/1971   Buehl .................... 65/32
3,929,440 A *  12/1975   Oldfield ................. 65/32.5
2004/0091798 A1 * 5/2004  Moore et al. ............ 430/5
2005/0209083 A1 * 9/2005  Takagi et al. ............ 501/11
2006/0101859 A1 * 5/2006  Takagi et al. ............ 65/32.5

FOREIGN PATENT DOCUMENTS

| JP | 06-293523 | 10/1994 |
| JP | 11-035338 | 2/1999 |
| JP | 2000-128549 | 5/2000 |
| JP | 2000-247647 | 9/2000 |
| JP | 2001-220149 | 8/2001 |
| JP | 2003300750 A * | 10/2003 |
| WO | WO 2003066539 A1 * | 8/2003 |

OTHER PUBLICATIONS

Derwent Abstract 2003-618544. Abstract of US 2005/0209083, WO 2003/066539, and JP 2003-300750.*
Table from "Valences of the Elements" from the http://chemistry.about.com/library/weekly/aa122002a.htm web article, article date Dec. 20, 2002.*

* cited by examiner

Primary Examiner—J. A. Lorengo
Assistant Examiner—Elizabeth A Bolden
(74) Attorney, Agent, or Firm—J.C. Patents

(57) ABSTRACT

A glass composition of the present invention relates to a multicomponent oxide glass composition manufactured by melting glass raw materials, which contains: 10 ppm or more of at least one type of a polyvalent element; minimum valence cations of the polyvalent element in a ratio of the minimum valence cation content to the total polyvalent element content of 5 to 98% in mass ratio; and 0.01 to 2 μl/g (0° C., 1 atm) of helium.

8 Claims, No Drawings

GLASS COMPOSITION

BACKGROUND OF THE INVENTION

1. Field of the Invention

The present invention relates to a glass composition.

2. Description of the Related Art

A glass composition is generally used in various applications as glass products by performing the following procedure: heating various salts, oxides, or the like such as inorganic minerals as raw materials to very high temperatures for forming molten glass, deacrating gas generated through a reaction for fining the molten glass, subsequently homogenizing the molten glass through an operation such as stirring, and then molding the molten glass into a required shape through a specific molding method. An initial problem in the manufacturing of such glass composition involves how to complete the discharging of minute air bubbles which exist in the molten glass. The above can be carried out during melting to provide a homogeneous glass. In other words, reliable fining can be conducted.

Accordingly, various methods have been studied thus far for overcoming the problem of fining. A method, which is most commonly used, involves the adjusting and mixing in advance of a trace additive, a so-called fining, into the raw materials to be melted, and the fine air bubbles are deaerated in the molten glass via a desired chemical reaction at high temperatures. Further, as by another method which may be adopted, a method of maintaining the molten glass in a reduced-pressure or vacuum environment by adjusting an external pressure of the environment itself in which the molten glass resides may be used.

Various additives have been used as fining for the former method, and appropriate fining has been selected in response to the diversification of providing different glass materials for use in the expanded scope of applications of the glass products. Further, various studies have been conducted on the latter method as well for developing many inventions regarding this technique.

Regarding the former method, as proposed in JP 06-293523 A, it is a method of directly introducing a fining agent into an air bubble layer of a glass melting furnace instead of mixing a fining agent into the raw materials in advance. Further, as proposed in JP 11-035338 A, it is an antimony fining agent which replaces an existing fining agent such as an arsenic (As) fining agent that is used thus far.

On the other hand, regarding the latter method, as proposed in JP 2000-128549 A, it is a manufacturing method for glass, which includes a sub-atmospheric pressure step in which the molten glass produced in a melting step is depressurized under sub-atmosphere. However, this method becomes feasible only with the use of a large-scale pressure-reducing vacuum system, thereby posing a problem of high equipment costs. In view of the above, JP 2000-247647 A discloses a furnace material, used for channels of the pressure-reducing vacuum system formed of a prescribed electric fused refractory instead of a precious metal such as platinum. Further, JP 2001-220149 A discloses a revised structure of a bubble collector which discharges the trapped air dissolved in the glass.

Further, dating back 20 years or more, as proposed in U.S. Pat. No. 3,622,296, it is a method of fining glass using helium gas, in which the borosilicate glass is used as an object of the fining.

Of the methods described above, the aforementioned method using a fining has a problem in that the manufacture of glass may not be necessarily stably sustained even when an optimal fining of a specific grade is selected at the beginning of the manufacture. This is because a grade of the glass manufactured may be at an unsatisfactory level with regard to having bubble holes based upon the unavoidable causes such as variabilities in manufacture conditions. Further, trace components are used as additives, and thus, the fining must be capable of uniformly distributed in the molten glass by preventing segregation or the like during mixing of the raw materials.

Further, the latter method using a pressure-reducing device also requires responding to basic problems arising from the theoretical restrictions of the method, even if the higher equipment cost can be handled to some extent. That is, evaporation (also referred to as vaporization) of glass components from the molten glass is hardly prevented when using the pressure-reducing device. Therefore, this method may have to be applied to limited glass applications which are rarely posing problems in evaporation of glass components during melting. Further, taking into account of an evaporation amount of the glass components during melting, the formulation of the raw material components may have to be designed in advance to provide a desired glass composition. Further, sufficient attention may have to be provided on the incidental facilities as compared to the general glass melting facilities so that the evaporated glass components are not carelessly discharged outside of the glass manufacture facilities. As described above, the adoption of this method to the fining of the molten glass forcibly and simultaneously requires the troubleshooting required by overcoming the issues in the method. Therefore, it is not easy for glass manufacturers to adopt this method because the adoption is relatively unfavorable.

Further, U.S. Pat. No. 3,622,296 discloses only the use of helium for the fining of a certain borosilicate glass, but suggests nothing about the glass materials which can be used for effectively fining with helium. Therefore, no attempt had been made on developing the method disclosed in U.S. Pat. No. 3,622,296 and on applying the method to other glass products of higher industrial utility value such as for oxide glass.

As described above, the conventional methods are unable to satisfy an important object of glass manufacture, which is to manufacture a homogeneous glass product without bubbles. Therefore, an improved solution is desired.

SUMMARY OF THE INVENTION

The present invention has been made in view of the above, and an object of the present invention regarding multicomponent oxide glass is therefore to provide a novel glass composition capable of drastically solving problems involved in fining during melting.

The adjusting of the contents of a polyvalent element, minimum valence cations thereof, and helium in a multicomponent oxide glass composition are found to possibly provide a solution to the problem involved in the fining during melting. A polyvalent element is an element having more than one valence.

The glass composition of the present invention is characterized by containing the following: 10 ppm or more of at least one type of a polyvalent element; the minimum valence cations of the polyvalent element in a ratio of the minimum valence cation content with respect to the total polyvalent element content to be in the range of 5 to 98% in mass ratio; and at 0.01 to 2 µl/g (0° C., 1 atm) of helium.

Here, the phrase "containing 10 ppm or more of at least one type of a polyvalent element" means that a total content of the polyvalent element is at 10 ppm or more, if the glass composition is to contain one type of polyvalent element. In addition, the above phrase means that a total content of each polyvalent element is at 10 ppm or more, if the glass composition is to contain two or more types of polyvalent elements. All or most of each polyvalent element exist as cations having multiple valences in the glass composition. The total content of each polyvalent element is in reference to a sum of all cations having different valences. If a part of the polyvalent element exists in the form as atoms in the glass composition, the total content is in reference to a total of the above sum of cation contents and the content as atoms. A content of the polyvalent element of less than 10 ppm is not preferable for attaining the discharging of bubbles in the glass. Further, generation of the bubbles in the molten glass may greatly vary depending on the varied external and uncertain melting conditions, such as temperature, and flow rate of the molten glass. Therefore, the content of each polyvalent element is preferably at 20 ppm or more for achieving more stable bubble-discharging properties, taken into account of the variation in bubble generation. Further, if the glass composition is to contain 3 or more types of polyvalent elements, the content of at least one polyvalent element is to be preferably at 50 ppm or more, for achieving high performance in the discharge of bubbles from the molten glass. Further, if a glass manufacture rate is at 100 cm$^3$/minutes or more, the content of at least one polyvalent element is to be preferably at 100 ppm or more. Further, if the glass product is used for applications having particularly demanding technical standards regarding bubble quality in the molten glass, the content of at least one polyvalent element is preferably to be at 200 ppm or more.

Further, the term "minimum valence cations" is in reference to the cations, having the minimum valence, of the multiple types of cations (cations of having different valences) of each polyvalent element in the glass composition. A mass ratio for the minimum valence cation content with respect to the total content of each polyvalent element is between 5 to 98%. In other words, if the glass composition contains one type of polyvalent element, the mass ratio of the minimum valence cation content to the total content of the polyvalent element is between 5 to 98%. If the glass composition contains two or more types of polyvalent elements, the mass ratio of each minimum valence cation content with respect to the total content of each polyvalent element is between 5 to 98%.

If the ratio of the minimum valence cation content is at 5% or more, an ability for fining minute air bubbles which exist in the molten glass is significant, wherein allowing the easy fining of air bubbles of 1 mm or smaller. If the ratio of the minimum valence cation content is at less than 5%, a sufficient function for fining cannot be observed. The ratio of the minimum valence cation content is preferably at 10% or more for a sufficiently stable fining function. Further, the ratio of the minimum valence cation content is preferably at 15% or more for achieving a sufficiently stable fining effect, and preferably at 20% or more for achieving a more stable fining effect, if the glass composition is to contain 3 or more types of polyvalent elements. On the other hand, if the ratio of the minimum valence cation content is too large, an amount of gas, such as oxygen gas, that is generated in accompanying the fining then becomes too large. Thus, even if the fining of minute bubbles that remained in the molten glass is to be attained, many new bubbles can be generated, and the fining itself becomes difficult. From these results, the ratio of the minimum valence cation content in the glass composition must be at 98% or less. That is to say, if the ratio of the minimum valence cation content is to exceed 98%, problem may arise in the bubbles that remain in the glass products after molding. Further, for the glass products which are required to melt at 1,300° C. or more, the ratio of the minimum valence cation content is at 95% or less, and preferably at 90% or less for achieving a more assuredly stable grade of glass products.

Further, the glass composition contains between 0.01 to 2 µl/g (0° C., 1 atm) of helium in the present invention. Incorporating a prescribed amount of the helium, which is an inert gas component, into the glass composition allows the complete removal or significant reduction of the air bubbles trapped in the molten glass by discharging the air bubbles from the molten glass, thereby providing a higher fining effect for the multicomponent oxide glass composition.

The helium is not involved in the network formation of a glass structure, but the coexistence of the polyvalent element having such a ratio of the minimum valence cation content as described above with the helium in the glass composition is to provide a high fining effect. The helium content providing such an effect must be 0.01 µl/g or more in the glass composition. If the helium content is less than 0.01 µl/g, a sufficient fining effect cannot be achieved.

On the other hand, if the helium content in the glass composition exceeds 2 µl/g, re-foaming called reboiling may likely be observed undesirably through the re-heating treatment or the like of the glass composition. A preferable upper limit of the helium content is at 1.4 µl/g for inhibiting reboiling, though it is varied depending upon the glass composition, heating conditions, or the like. The preferable upper limit of the helium content is shifted to a lower value for a glass composition, in which a fining agent other than helium coexists, to as low as 0.9 µl/g, because reboiling tends to occur more easily.

A satisfactory fining effect may perhaps be provided when a prescribed amount of the polyvalent element and the helium are coexisted together in the glass composition.

The helium is often called an inert gas, a noble gas, or the like, and has a stable closed shell structure, and is a monoatomic molecule. Further, the helium is the lightest element among the noble gas elements, and is also structurally very small with an atomic radius of 1.95 angstroms. An attracting force from Van der Waals forces of the helium is very small; and thus, the helium does not solidify and is a liquid even at absolute zero at atmospheric pressure. The helium exists inside holes of a network structure in glass constructed by other components in the glass composition manufactured through high-temperature melting and cooling.

On the other hand, the elements which constitute the molten glass are generally in a network state having a weak bonding force. The higher the temperature, the more vigorously each element position changes irregularly, accompanied by stretching vibration, rotation vibration, and angular vibration at relatively higher speeds. As described above, the helium is hardly bonded with various elements which constitutes the molten glass and has a size which allows for passing through of gaps of a vibrating network used as pathways. Thus, the helium is capable of being easily diffused even when bubbles exist as defects in the molten glass, and without being affected by the surrounding elements.

When the polyvalent element is dissolved in such molten glass, cations of the polyvalent element in the molten glass generally are in a state where multiple types of cations having different valences exist in a specific ratio. However, coexistence with the helium in the molten glass shifts equilibrium among ratios of the multiple types of cations of the polyvalent element to a condition where the amount of low valence cations is relatively increased. As a result, the amount of cations having lower valence increases in the molten glass while an excess gas component such as oxygen generates along with the equilibrium shift. Then, the generated gas component such as oxygen, is diffused with the dissolved helium even when minute air bubbles exist in the molten glass. Thus, the diameters of the minute bubbles are expanded to significantly increase a floating rate of the minute air bubbles in the molten glass. As a result, the bubbles in the molten glass are discharged out of the glass, and thus, the fining has taken place.

The "multicomponent oxide glass composition" of the present invention is referred to the oxide glass containing two or more types of oxides as the main components and containing mass ratio of 50% or more in total of the two or more types of oxides, as main components. The "multicomponent oxide glass composition" of the present invention does not apply to a glass composition having a single composition with several components mixed as impurities. For example, the "multicomponent oxide glass composition" of the present invention does not apply to a glass composition having close to 99% in mass ratio in percentage % of a single component such as silica, and 0.09 or less in mass %, at two decimal places, of the several components, respectively.

Further, the glass composition of the present invention preferably contains, in addition to the above components, at least one component selected from the group consisting of fluorine (F), chlorine (Cl), and sulfur trioxide ($SO_3$), in a mass ratio of 1 ppm or more, or a hydroxide group (OH group) in a mass ratio of 10 ppm or more.

If one component is selected from F, Cl, and $SO_3$, the content ratio thereof is 1 ppm or more. If two components or three components are selected therefrom, the content ratio of each component is 1 ppm or more.

Various components which may be gasified exist in the glass composition. A particularly visible effect of the present invention may be observed with the F, Cl, $SO_3$, or the OH group. F, Cl, or $SO_3$ existing in a mass ratio of 1 ppm or more can improve the fining of the molten glass. The OH group must exist in a mass ratio of 10 ppm or more for exhibiting the same effect as with F, Cl, and $SO_3$. Improvement in the fining through the presence of those components is presumed to result from possible actions of F, Cl, $SO_3$, or the OH group during the air bubble generation in the molten glass, for suppressing the generation of numerous bubbles of minute diameters and for generating bubbles with as large diameters as possible.

Here, F has a function of promoting fining by reducing viscosity of the molten glass, but is preferably incorporated in a mass ratio of 20 ppm or more, for more assuredly performing the fining. Further, a high-viscosity glass composition melted at 1,400° C. or more is to preferably contain 50 ppm or more of F. On the other hand, the amount of F added is preferably kept as low as possible for achieving environmental conservation. Further, an upper limit of the amount of F added should not exceed 0.5% in mass percent even irregardless of environmental concerns.

Further, Cl has been considered to provide a effect upon fining of the molten glass similar to F. However, the effect of the present invention exceeds the fining effect provided by using Cl alone. Addition of Cl in a mass ratio of 1 ppm or more provides a homogeneous glass through assured fining, even for glass that is considered to be hardly homogenized. Such a hardly-homogenized glass contains preferably 10 ppm or more in mass ratio of Cl added for achieving a higher fining function, preferably 30 ppm or more thereof added for achieving highly stable fining that is not affected by operational or furnace conditions, or the like. Further, if a large amount of the helium cannot be added under various circumstances, the added helium must be used for the fining. In such a case, 100 ppm or more of Cl is preferably incorporated. The hardly-homogenized glass such as no-alkali glass contains preferably 200 ppm or more of Cl added, preferably at possibly 300 ppm or more thereof added for achieving improved stability.

Further, $SO_3$ is added in the glass by employing a sulfate as a raw material, and $SO_3$ has been used for improving an effect on fining of the molten glass, where the solubility is larger at lower temperatures and smaller at higher temperatures. However, the effect of the present invention exceeds the fining effect provided using $SO_3$ alone, and such an effect can be provided by adding 1 ppm or more of $SO_3$ in mass ratio. A glass composition with lower reactivity at high temperatures contains preferably 20 ppm or more of $SO_3$ added, and preferably 50 ppm or more thereof added for providing improved stability. A higher-viscosity glass composition requiring higher temperatures of 1,400° C. or more for melting thereof preferably contains 300 ppm or more of $SO_3$ added.

The OH group is similar to F or the like have attracted attention to reduce higher-temperature viscosity of the glass, to allow for easier floating of the bubbles in the molten glass. The OH group is known to possess a clarification function similar to F. However, the effect of the present invention exceeds the fining effect provided using the OH group alone, and such an effect may be provided by adding 10 ppm or more of the OH group in mass ratio. A glass composition having higher high-temperature viscosity and requiring 1,200° C. or more for melting thereof contains preferably 40 ppm or more of the OH group added, preferably at 60 ppm or more thereof for achieving improved stability. Further, 100 ppm or more of the OH group may be added for cases where a sufficiently added amount of the helium cannot be ensured.

Further, in the above composition, the ratio of the content of the minimum valence cations of the polyvalent element to the polyvalent element content is preferably higher by 0.1 to 40% as compared to that of a glass composition manufactured by melting in an oxygen-containing atmosphere. That is, the glass composition of the present invention has a relatively increased amount of the minimum valence cations of the polyvalent element by the above ratio compared to the glass composition manufactured using the same glass raw materials as those of the glass composition of the present invention under the same manufacture conditions with the exception of having the oxygen-containing atmosphere as a melting atmosphere.

Here, if the glass composition contains multiple types of polyvalent elements, the above conditions are preferably provided for each of the polyvalent elements. Further, "oxygen-containing atmosphere" is referred to an atmosphere containing 1 vol % or more oxygen.

If the ratio of the minimum valence cation content is higher by less than 0.1% compared to that of the glass composition manufactured by melting in an oxygen-containing atmosphere, the ability to deaerate the bubbles from the molten glass becomes more diminished. The ratio is higher by 0.3% or more, and more preferably higher by 0.5% or more. If the ratio is higher by 1% or more, efficient fining can be provided for higher-viscosity molten glass from which the fine bubbles of about 0.1 mm are hardly eliminated. Such a ratio is particularly preferable for a glass composition which requires melting at 1,400° C. or more.

On the other hand, if the ratio of the minimum valence cation content is higher by more than 40% compared to that of the glass composition manufactured by melting in an oxygen-containing atmosphere, a discharging of bubbles is undesirably reduced. Further, the ratio is preferably higher by 30% or less for the molten glass having a viscosity of $10^3$ dPa·s at high temperatures of 1,000° C. or more, and preferably higher by 20% or less for achieving a more bubble discharging stability.

Further, in the above composition, the glass composition preferably contains 1 ppm or more of the polyvalent element cations. If the glass composition contains multiple types of polyvalent elements, the above conditions are preferably provided for each of the polyvalent elements.

Further, the polyvalent element is preferably an element having a first ionization energy of between 6 to 10 eV. The promotion bubble discharge from the molten glass has become apparently higher, particularly when the first ionization energy of the polyvalent element, the energy required for the polyvalent element to discharge an electron to become a cation, is within the above range. A reason for such has not been revealed, but the inventors of the present invention presume that when the energy required for transition to a different electronic state has fallen within a prescribed range, an equilibrium constant of oxidation-reduction equilibrium regarding the polyvalent element in the molten glass is changed through the diffusion of the helium into the molten glass. The oxidation-reduction equilibrium changes relatively, and therefore, the gas such as oxygen is easily discharged.

In the above composition, the polyvalent element is preferably at least one type of an element selected from the group consisting of vanadium (V), chromium (Cr), manganese (Mn), iron (Fe), cobalt (Co), nickel (Ni), copper (Cu), zinc (Zn), gallium (Ga), germanium (Ge), arsenic (As), selenium (Se), yttrium (Y), zirconium (Zr), molybdenum (Mo), rhodium (Rh), silver (Ag), cadmium (Cd), tin (Sn), antimony (Sb), tellurium (Te), titanium (Ti), platinum (Pt), gold (Au), and bismuth (Bi).

The glass composition of the present invention, which is a multicomponent oxide glass composition, contains at least two types of elements which may become cations as the elements constituting the glass in addition to the polyvalent element, and further contains oxygen as an element which may become an anion.

Specific examples of the elements which may become cations include silicon (Si), aluminum (Al), boron (B), phosphorus (P), lead (Pb), magnesium (Mg), calcium (Ca), strontium (Sr), barium (Ba), lanthanum (La), lithium (Li), sodium (Na), potassium (K), gallium (Ga), and cesium (Cs). The glass composition of the present invention contains at least two types of the above elements.

Further, a preferable example of the glass composition of the present invention is silicate glass containing $SiO_2$ at within the range of 30 mass % to 80 mass %, is represented as oxides.

Further, preferable examples of the glass composition of the present invention will be listed below, concerning various applications or the like as well: a glass composition preferably containing 40 to 70% $SiO_2$, 5 to 25% $Al_2O_3$, 5 to 20% $B_2O_3$, and 0 to 50% RO (R=Mg+Ca+Ba+Sr+Zn) in mass percentage for no-alkali glass used in liquid crystal displays or the like, for example; a glass composition preferably containing 45 to 70% $SiO_2$, 0 to 20% $Al_2O_3$, 0 to 55% RO (R=Mg+Ca+Ba+Sr+Zn), and 0 to 5% $B_2O_3$ for sheet glass used in flat panel displays except for liquid crystal displays, for example; a glass composition preferably containing 50 to 80% $SiO_2$, 10 to 35% $Al_2O_3$, 1 to 10% $Li_2O$, and 0 to 39% RO (R=Mg+Ca+Ba+Sr+Zn) for crystallized glass used in building materials, cooking utensils, optical parts, or the like, for example; a glass composition preferably containing 40 to 70% $SiO_2$, 0.1 to 20% $Al_2O_3$, 5 to 20% $B_2O_3$, and 0 to 55% RO (R=Mg+Ca+Ba+Sr+Zn) for glass used in sheet glass for optical semiconductor case and packaging applications and optical parts such as lenses, for example; and a glass composition preferably containing 50 to 70% $SiO_2$, 0.1 to 25% $Al_2O_3$, and 0.5 to 30% RO (R=Mg+Ca+Ba+Sr+Zn) for glass fiber used in a printed-wiring assembly or a composite mixed with concrete, for example.

If Sn is selected as the polyvalent element, a ratio of a divalent cation content of Sn to the total Sn content is preferably between 20 to 50%, more preferably between 20 to 45%, and further even more preferably at between 26 to 40% in mass ratio.

Here, Sn cations existing in the molten glass are $Sn^{2+}$ (divalent cation) and $Sn^{4+}$ (tetravalent cation), and the minimum valence cation of Sn is $Sn^{2+}$. The total Sn content, following the criteria described above, is the sum of the $Sn^{2+}$ and the $Sn^{4+}$ amounts, or the total of the above sum of the cation contents and the Sn content if a part of the Sn is existed as Sn atoms in the glass composition. Sn is often used in the manufacturing of sheet glass, for the refractive index adjustment of optical glass, or the like. More preferable results can be provided by restricting the ratio of the $Sn^{2+}$ content within the above range, $Sn^{2+}$ being the minimum valence cation of Sn.

Further, if Sb is selected as the polyvalent element, a ratio of a trivalent cation content of Sb to the total Sb content is preferably at 70% or more, more preferably at 80% or more, and further more preferably at 91% or more in mass ratio.

Here, Sb cations existing in the molten glass are $Sb^{3+}$ (trivalent cation) and $Sb^{5+}$ (pentavalent cation), and the minimum valence cation of Sb is $Sb^{3+}$. The total Sb content, following the criteria described above, is the sum of $Sb^{3+}$ and $Sb^{5+}$ amounts, or the total of the above sum of the amount of cation and amount of the Sb if a part of Sb exists as Sb atoms in the glass composition. Sb is often used as a fining agent for the molten glass, and more preferable results can be provided by restricting the ratio of the $Sb^{3+}$ content within the above range, with $Sb^{3+}$ being the minimum valence cation of Sb.

Further, if As is selected as the polyvalent element, a ratio of a trivalent cation content of As to the total As content is preferably at 60% or more, more preferably at 70% or more in mass ratio.

Here, As cations existing in the molten glass are $As^{3+}$ (trivalent cation) and $As^{5+}$ (pentavalent cation), and the minimum valence cation of As is $As^{3+}$. The total As content, following the criteria described above, is the sum of the amounts $As^{3+}$ and $As^{5+}$, or the total of the above sum of the amounts of cation and As if a part of As exists as the As atoms in the glass composition. As is used as a fining agent for the molten glass similar to Sb. More preferable results can be provided by restricting the ratio of the $As^{3+}$ content within the above range, $As^{3+}$ being the minimum valence cation of As.

Further, if Fe is selected as the polyvalent element, a ratio of a divalent cation content of Fe to the total Fe content is preferably at 30% or more, and more preferably at 40% or more in mass ratio.

Here, Fe cations existing in the molten glass are $Fe^{2+}$ (divalent cation) and $Fe^{3+}$ (trivalent cation), and the minimum valence cation of Fe is $Fe^{2+}$. The total Fe content, following the criteria described above, is the sum of the amounts of $Fe^{2+}$ and $Fe^{3+}$, or the total of the above sum of the amounts of cation and the Fe if a part of Fe exists as the Fe atoms in the glass composition. Fe is added to the glass, for purposes such as glass coloring and enhancing infrared absorption ability, or is mixed into the glass by employing a silica or alumina raw material or the like of not high-purity. More preferable results can be provided by restricting the ratio of the $Fe^{2+}$ content within the above range, with $Fe^{2+}$ being the minimum valence cation of Fe.

Further, the glass composition of the present invention can appropriately contain the following: colorants such as other transition metal compounds, tellurium compounds, selenium compounds, rare earths, and sulfides exhibiting color with various colored ions, additives causing colloid coloring such as a CdS—CdSe solid solution, and radiation coloring additives such as Ce, and additives of scarce metal elements for adjusting transmittance or refractive index. Further, in contrast, elements such as U, Th, Pb, Ra, and K may be finely controlled as appropriate on an order on the scale of ppm or ppb to allow melting of the glass so that the molten glass contains a minimal amount of the elements, for handling the demands from applications employing the glass composition.

Further, the glass composition of the present invention can respond to various manufacturing conditions according to such applications including the following: ion exchange treatment for imparting desired properties such as strength property and optical property; provisioning of various thin films to a glass surface; implantation of specific ion species to the glass surface; glass surface treatment with chemicals for improving surface property of the glass or the like; solidification of radioactive substances or toxic substances; rapid-quenching vitrification and molding using liquid nitrogen, liquid helium, or the like; glass manufacture by ultrahigh temperature melting using solar energy or the like; special glass manufacture using a phenomenon of crystallization or the like under ultra-high pressure conditions; and inclusion of specific additives for imparting other special electromagnetic properties to the glass.

Further, an example of the raw materials which can be used for manufacturing the glass composition of the present invention includes materials containing: a single substance, a mixture, or a compound of inorganic substances such as oxides, carbonates, phosphates, chlorides, and various glass as a main component; and a single substance, a mixture, or a compound of organic additives, metal additives, or the like in addition to the above various inorganic substances as an additive. Classification of the glass based on the source of the glass materials such as natural products, synthetic products, or purified products is not significant. Further, highly purified industrial products, with impurities on the order of ppm or ppb, which are removed through various methods, can be employed as the raw materials of the glass composition of the present invention. Further, general raw materials for glass manufacturing, that are used in mining and chemical industry, may also be used as raw materials of the glass composition of the present invention.

Further, melting of the glass raw materials generally involves the following steps: collectively maintaining the glass raw materials in a heat-resistant container of ceramics, platinum, or the like as while supplying energy from a heat source such as electricity or gas; and then melting the materials while preventing the multiple raw materials from separating during high-temperature heating. However, methods which may be employed as appropriate include the following: applying external force such as current pressure and electromagnetic force; and floating the molten glass above the liquid metal.

(1) As described above, a glass composition of the present invention contains the following: 10 ppm or more of at least one type of a polyvalent element; minimum valence cations of the polyvalent element in a ratio of the minimum valence cation content to total content of the polyvalent element of 5 to 98% in mass ratio; and 0.01 to 2 µl/g (0° C., 1 atm) of helium in a multicomponent oxide glass composition, allowing the discharge of minute air bubbles existing in molten glass from the molten glass by rapidly expanding the diameters of the bubbles during melting. Therefore, homogeneous glass products with reduced or no bubble defects can be manufactured by achieving a satisfactory fining effect during melting even with glass materials which have been conventionally melted and manufactured into homogeneous glass products.

(2) A fining effect of molten glass may be further enhanced with a glass composition containing, in addition to the above components, 1 ppm or more of at least one component selected from the group consisting of F, Cl, and $SO_3$, and/or 10 ppm or more of OH in mass ratio.

(3) Further, a stable and efficient fining can be achieved with a glass composition having a higher ratio of the minimum valence cation content by 0.1 to 40% compared to that of a composition manufactured by melting in an oxygen-containing atmosphere or incorporating 1 ppm or more of polyvalent cations in the glass composition.

(4) Selecting at least one type of an element, as a polyvalent element, from the group consisting of V, Cr, Mn, Fe, Co, Ni, Cu, Zn, Ga, Ge, As, Se, Y, Zr, Mo, Rh, Ag, Cd, Sn, Sb, Te, Ti, Pt, Au, and Bi for allowing the selected polyvalent element to contribute to glass coloring and to an improvement in chemical durability, in addition to the fining. Further, the selected polyvalent element can impart various functions at higher levels to the glass composition, in addition to homogeneity.

(5) In particular, selecting Sn, Sb, As, or Fe as a polyvalent element and adjusting a ratio of a minimum valence cation content to a total amount of each of those elements within a specific range produces more preferable results regarding fining.

DETAILED DESCRIPTION OF THE INVENTION

Hereinafter, the glass composition of the present invention will be described in detail by way of examples.

Example 1

The inventors of the present invention have conducted a research following a procedure described below to confirm fining performance of a glass composition of the present invention. First, Table 1 shows the researched glass compositions. In Table 1, reference symbol A represents no-alkali glass with poor melting property, and reference symbol B represents glass with excellent melting property, containing relatively high amounts of alkali metal elements. Reagent grade, high purity glass raw materials were selected to yield the glass compositions shown in Table 1, and preliminary analysis confirmed that the amounts of impurities or the like can be sufficiently grasped as well. The raw materials were weighed and then subjected to mixing for 1 hour using a rotary raw material mixer, to thereby prepare a raw material batch which is subjected to sufficient mixing. Then, the raw material batch was charged into a platinum-rhodium crucible. The crucible was placed in an indirect electric resistance furnace maintained at a prescribed temperature, and then maintained at 1,550° C. for 2 hours, to thereby produce a vitrification reaction. The batch was subjected to 4 more hours of melting while adjusting a helium content in the glass by introducing helium, while the gas is adjusted to 50 to 99.9% concentration with nitrogen, into the furnace through a gas supply pipe.

Subsequently, molten glass was slowly cooled to room temperature inside the furnace, and investigations were conducted by gathering the samples required for the determination of the number of bubbles in the glass obtained, for the analysis of amount of helium (He) gas in the glass, and for the analysis of the polyvalent elements. Determination of the number of bubbles involved using both visual observation and observation under a microscope of 20 power magnification. Further, helium gas was analyzed using a quadrupole mass spectrometer (QMA125, manufactured by Balzers AG) installing a secondary electron multiplier (SEM) for improved measurement sensitivity. Gas analysis using the quadrupole mass spectrometer involved the following steps: placing a required amount of glass sample to be measured in a platinum dish, keeping the platinum dish in a sample chamber to vacuum of $10^{-5}$ Pa (that is, $10^{-8}$ Torr), and introducing the gas heated and discharged into the quadrupole mass spectrometer having a measuring sensitivity of 0.001 μl/g.

Further, the valences of the polyvalent elements in the glass were analyzed using the necessary analyzers or the like after the obtained glass was decomposed with an acid or dissolved in an alkali. Sn and $Sn^{2+}$ were analyzed through the following mode, for example. Part of a glass block which is cooled was used for chemical analysis to determine the total amount of existing Sn and $Sn^{2+}$. The total amount of existing Sn and $Sn^{2+}$ was determined through instrumental analysis and redox titration after the glass was decomposed in an acidic solution. Further, an amount of $Sn^{2+}$ was indirectly determined by titrating the amount of $Fe^{2+}$, formed from reduction by $Sn^{2+}$ in the decomposed solution, with a cerium sulfate solution. To be specific, the total amount of Sn was determined by preparing a sample solution through heat decomposition of glass powder with sulfuric acid and hydrofluoric acid and subsequent dissolution of the decomposed glass powder in hydrochloric acid and by using an ICP-AES device. $Sn^{2+}$ was heat decomposed for 10 minutes (in water bath) in an inert gas environment by first adding 2 ml of a 0.1% $Fe^{3+}$ solution to the glass powder and then adding the sulfuric acid and the hydrofluoric acid thereto. During the heat decomposition, $Fe^{3+}$ was reduced by $Sn^{2+}$ to form $Fe^{2+}$. Subsequently, boric acid was added to the resultant solution to neutralize the excess hydrofluoric acid, and then introduction of the inert gas was stopped. Then, 1 ml of a 0.015 M $OsO_4$ solution was added to the resultant solution as a catalyst, and 1.0 ml of an o-phenanthroline indicator was added. $Sn^{2+}$ was analyzed and an amount thereof was determined through indirect titration involving titrating with a 1/200 N cerium sulfate solution until the color of the solution is changed from orange to pale blue.

TABLE 1

| Components | Glass name | |
|---|---|---|
| (mass %) | A | B |
| $SiO_2$ | 59.0 | 61.5 |
| $Al_2O_3$ | 16.3 | 2.1 |
| $B_2O_3$ | 9.0 | — |
| CaO | 5.3 | — |
| SrO | 6.1 | 9.0 |
| BaO | 3.1 | 9.7 |
| ZnO | 1.0 | 0.5 |
| $Na_2O$ | — | 7.5 |
| $K_2O$ | — | 7.5 |
| $TiO_2$ | — | 0.6 |
| $ZrO_2$ | 0.2 | 1.6 |

Table 2 shows the obtained results. Glass types in Table 2 correspond to glass names in Table 1. As shown in Table 2, glass was prepared by adding 1.0% in mass ratio of As, Sb, or Sn as an oxide of the polyvalent element and adjusting a ratio of the amount of the minimum valence cation to that of the polyvalent element. In samples 1 to 9, the number of bubbles in the glass after melting was between 1 to 136 bubbles per 10 g of glass.

TABLE 2

| | Sample | | | | | | | | |
|---|---|---|---|---|---|---|---|---|---|
| | 1 | 2 | 3 | 4 | 5 | 6 | 7 | 8 | 9 |
| Glass type | A | A | A | A | A | A | A | A | A |
| Type of polyvalent element oxide | $As_2O_3$ | $As_2O_3$ | $As_2O_3$ | $Sb_2O_3$ | $Sb_2O_3$ | $Sb_2O_3$ | $SnO_2$ | $SnO_2$ | $SnO_2$ |
| Amount of polyvalent element oxide added (mass %) | 1.0 | 1.0 | 1.0 | 1.0 | 1.0 | 1.0 | 1.0 | 1.0 | 1.0 |
| (Amount of minimum valence cations)/(amount of polyvalent elements) × 100 | 75 | 77 | 80 | 91 | 92 | 96 | 27 | 28 | 29 |

TABLE 2-continued

| | Sample | | | | | | | | |
|---|---|---|---|---|---|---|---|---|---|
| | 1 | 2 | 3 | 4 | 5 | 6 | 7 | 8 | 9 |
| He content (µl/g-glass: 0° C., 1 atm) | 0.01 | 0.02 | 0.05 | 0.01 | 0.04 | 0.05 | 0.02 | 0.04 | 0.07 |
| Number of bubbles (bubbles/10 g-glass) | 15 | 9 | 1 | 136 | 120 | 70 | 31 | 20 | 1 |

Comparative Example 1

Melting was conducted following a similar procedure as in Example 1 and using the same device as in Example 1, except that the melting was conducted in air for 4 hours instead of in helium for 4 hours in the final step as in Example 1 (step of melting while introducing helium). Table 3 shows the results.

TABLE 3

| | Sample | | |
|---|---|---|---|
| | 10 | 11 | 12 |
| Glass type | A | A | A |
| Type of polyvalent element oxide | $As_2O_3$ | $Sb_2O_3$ | $SnO_2$ |
| Amount of polyvalent element oxide added (mass %) | 1.0 | 1.0 | 1.0 |
| (Amount of minimum valence cations)/(amount of polyvalent elements) × 100 | 72 | 90 | 26 |
| He content (µl/g-glass: 0° C., 1 atm) | <0.01 | <0.01 | <0.01 |
| Number of bubbles (bubbles/10 g-glass) | 46 | 182 | 115 |

As (arsenic), which is the same polyvalent element as in the samples 1, 2, and 3 (Example 1) in Table 2, was used for the sample 10 (Comparative Example 1) in Table 3. Sb (antimony), which is the same polyvalent element as in the samples 4, 5, and 6 (Example 1) in Table 2, was used for the sample 11 (Comparative Example 1) in Table 3. Sn (tin), which is the same polyvalent element as in the samples 7, 8, and 9 (Example 1) in Table 2, was used for the sample 12 (Comparative Example 1) in Table 3. However, comparing the samples of Example 1 and Comparative Example 1 by the types of polyvalent elements added confirmed that the number of bubbles in the glass in Example 1 was significantly reduced compared to the glass in Comparative Example 1. Further, analysis of the helium content in the glass in Comparative Example 1 (samples 10 to 12) resulted in a low value of less than 0.01 µl/g, probably mixed from air or the like.

Further, $As^{3+}$ content ratios (ratios of $As^{3+}$ contents to total As contents) of the samples 1, 2, and 3 (Example 1) in Table 2 were respectively 75%, 77%, and 80% in mass ratio, $As^{3+}$ being the minimum valence cation of As. Those values were higher by 3%, 5%, and 8% as compared to the $As^{3+}$ content ratio of sample 10 in Table 3 of 72%. Similarly, $Sb^{3+}$ content ratios (ratios of $Sb^{3+}$ contents to total Sb contents) of the samples 4, 5, and 6 (Example 1) in Table 2 were respectively 91%, 92%, and 96% in mass ratio, with $Sb^{3+}$ being the minimum valence cation of Sb. Those values were higher by 1%, 2%, and 6% compared to the $Sb^{3+}$ content ratio of the sample 11 in Table 3 of 90%. Further, $Sn^{2+}$ content ratios (ratios of $Sn^{2+}$ contents to total Sn contents) of the samples 7, 8, and 9 (Example 1) in Table 2 were respectively 27%, 28%, and 29% in mass ratio, with $Sn^{2+}$ being the minimum valence cation of Sn. Those values were higher by 1%, 2%, and 3% as compared to the $Sn^{2+}$ content ratio of the sample 12 in Table 3 of 26%.

Example 2

Melting was conducted following a similar procedure as in Example 1, using the same device as in Example 1 and using glass raw materials containing sulfates, chlorides, and hydroxides so that the amounts of $SO_3$, Cl, and OH added could be changed. Table 4 shows the results.

TABLE 4

| | Sample | | | | | | | | |
|---|---|---|---|---|---|---|---|---|---|
| | 13 | 14 | 15 | 16 | | 17 | | 18 | |
| Glass type | B | B | B | A | | A | | A | |
| Type of component added | $SO_3$ | $SO_3$ | $SO_3$ | Cl | OH | Cl | OH | Cl | OH |
| Content of component added in glass (mass %) | 0.14 | 0.12 | 0.05 | 0.16 | 0.014 | 0.15 | 0.012 | 0.13 | 0.006 |
| He content (µl/g-glass: 0° C., 1 atm) | 0.01 | 0.03 | 0.07 | 0.01 | | 0.04 | | 0.06 | |
| Number of bubbles (bubbles/10 g-glass) | 4 | 2 | 1 | 47 | | 28 | | 16 | |

The samples 13, 14, and 15 were glass containing sulfates, used as raw materials, that are added to glass B shown in Table 1, for providing homogeneous glass with a very little number of bubbles in the glass. Further, the samples 16, 17, and 18 were glass containing chlorides and hydroxides, used as raw materials, that are added to glass A shown in Table 1, for providing glass with 16 to 47 bubbles per 10 g of glass, which is of a sufficiently small number of bubbles in the glass.

Comparative Example 2

Melting was conducted following a similar procedure as in Example 2 and using the same device as in Example 2, except that the melting was conducted in air for 4 hours instead of in helium for 4 hours as in the final step in Example 2 (step of melting while introducing helium). Table 5 shows the results.

TABLE 5

|  | Sample | |
|---|---|---|
|  | 19 | 20 |
| Glass type | B | A |
| Type of component added | $SO_3$ | Cl | OH |
| Content of component added (mass %) in glass | 0.20 | 0.17 | 0.019 |
| He content (µl/g-glass: 0° C., 1 atm) | <0.01 | <0.01 |
| Number of bubbles (bubbles/10 g-glass) | 10 | 145 |

The sample 19 (Comparative Example 2) in Table 5 was glass containing $SO_3$ added to glass B, similar to the samples 13, 14, and 15 (Example 2) in Table 4, providing glass with a larger number of bubbles compared to the samples 13, 14, and because helium was not introduced. Further, the sample 20 (Comparative Example 2) of Table 5 was glass containing Cl or OH added to glass A, similar to the samples 16, 17, and 18 (Example 2) in Table 4, providing glass with a significantly larger number of bubbles, at 145 bubbles per 10 g of glass, as compared to the samples 16, 17, and 18 because helium was not introduced.

Example 3

Based on the above results, the inventors of the present invention have attempted to introduce the helium gas into an actual continuous melting furnace manufacturing a glass product shown in Table 6, to thereby improve the number of bubbles. The glass product shown in Table 6 is used for image display devices such as liquid crystal displays.

TABLE 6

| | | | | | | | | | | (mass %) |
| Glass name | $SiO_2$ | $Al_2O_3$ | MgO | $Li_2O$ | $Na_2O$ | $K_2O$ | $P_2O_5$ | $ZrO_2$ | $TiO_2$ | $As_2O_3$ |
|---|---|---|---|---|---|---|---|---|---|---|
| C | 65.8 | 22.3 | 0.6 | 4.1 | 0.6 | 0.4 | 1.4 | 2.3 | 2.0 | 0.5 |

The melting furnace used for manufacturing the above glass product is a tank melting furnace provided with a first melting chamber, a second melting chamber, and a fining chamber. The furnace is provided with two heat sources of gas firing and electrodes. The furnace has a maximum melting temperature of 1,600° C. and requires 48 hours of residence time for the molten glass. The helium was introduced from hearth of the first melting chamber through a heat-resistant gas introducing pipe into the molten glass at 30 l/minutes. The fining effect and the dissolved components in the glass manufactured as above were analyzed. As a result, 0.08 µl/g of helium was dissolved in the glass, and a ratio of the minimum valence cation ($As^{3+}$) content to the total As content was 76% in mass ratio. In addition, the glass had 1 air bubble/kg of glass, homogeneity is enhanced, and improved efficiency is improved by 1.2% percentage as compared to conventional products.

What is claimed is:

1. A glass composition, for a sheet glass used in flat panel displays or for a crystallized glass, of a multicomponent oxide glass manufactured by melting glass raw materials, comprising:
   10 ppm or more of at least one type of a polyvalent element selected from the group consisting of V, Cr, Mn, Fe, Co, Ni, Cu, Ga, Ge, As, Se, Y, Zr, Mo, Rh, Ag, Cd, Sn, Sb, Te, Ti, Pt, Au, and Bi;
   minimum valence cations of the polyvalent element in a ratio of a minimum valence cation content to a total polyvalent element content of 5 to 98% in mass ratio; and
   0.01 to 2 µl/g (0° C., 1 atm) of helium.

2. A glass composition according to claim 1, further comprising at least one of:
   1 ppm or more in mass ratio of at least one component selected from the group consisting of F, Cl, and $SO_3$; and
   10 ppm or more in mass ratio of OH.

3. A glass composition according to claim 1, wherein a mass ratio of the minimum valence cation content is higher by 0.1 to 40% as compared to the ratio of a glass composition manufactured by melting in an oxygen-containing atmosphere.

4. A glass composition according to claim 1, wherein the cations of the polyvalent element are presented in an amount of 1 ppm or more.

5. A glass composition according to claim 1, wherein the polyvalent element is Sn, and a mass ratio of a divalent cation content of Sn to a total Sn content is between 20 to 50%.

6. A glass composition according to claim 1, wherein the polyvalent element is Sb, and a mass ratio of a trivalent cation content of Sb to a total Sb content is 70% or more.

7. A glass composition according to claim 1, wherein the polyvalent element is As, and a mass ratio of a trivalent cation content of As to a total As content is 60% or more.

8. A glass composition according to claim 1, wherein the polyvalent element is Fe, and a mass ratio of a divalent cation content of Fe to a total Fe content is 30% or more.

* * * * *